Sept. 14, 1954   B. A. SWANSON   2,688,798
RIGHT-ANGLE CUTTING TOOL
Filed Feb. 27, 1952   2 Sheets-Sheet 1
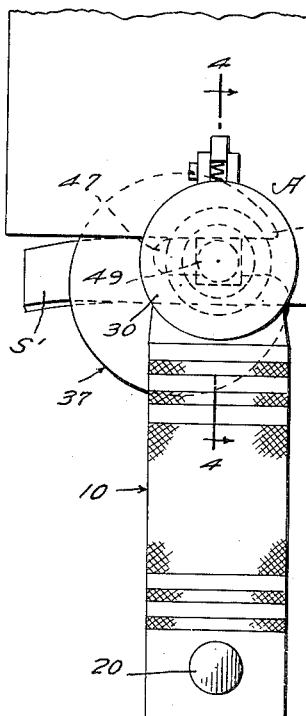
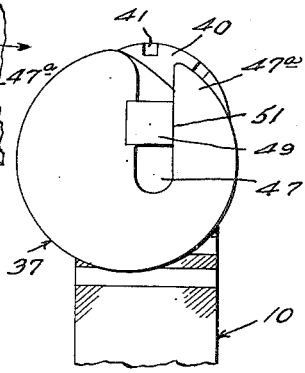
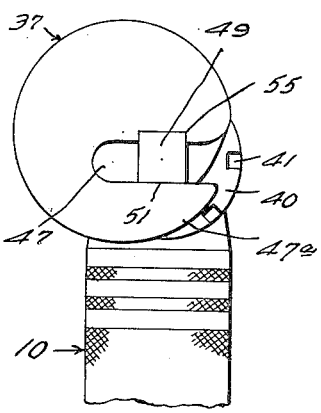
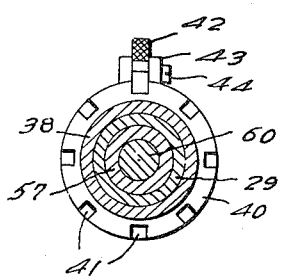
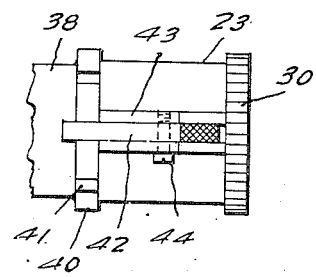
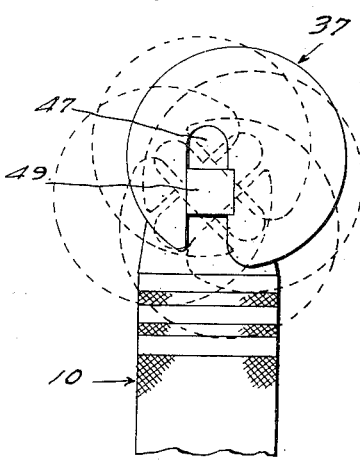
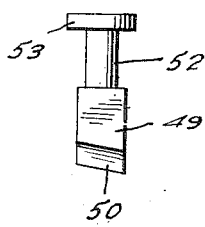
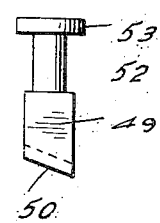
INVENTOR.
Bernard A. Swanson
BY
Wilfred Lawson
ATTY Sept. 14, 1954     B. A. SWANSON     2,688,798
RIGHT-ANGLE CUTTING TOOL
Filed Feb. 27, 1952                2 Sheets—Sheet 2
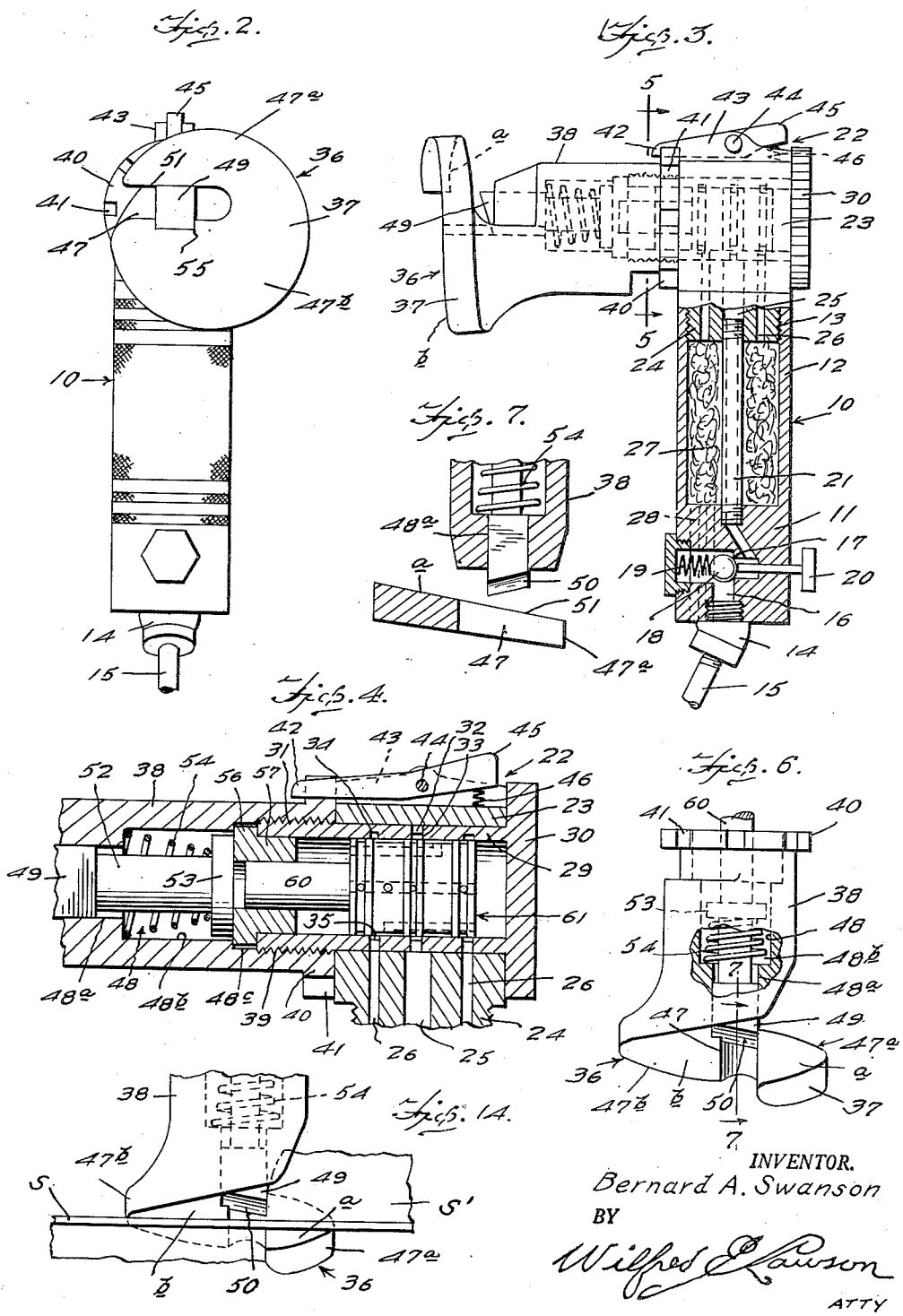
INVENTOR.
Bernard A. Swanson
BY
Wilfred E. Lawson
ATTY Patented Sept. 14, 1954

2,688,798

UNITED STATES PATENT OFFICE 2,688,798

RIGHT-ANGLE CUTTING TOOL

Bernard A. Swanson, Seattle, Wash.

Application February 27, 1952, Serial No. 273,589

8 Claims. (Cl. 30—228)

This invention relates generally to cutting tools, more particularly to a tool employing a reciprocating cutter for use in cutting or shearing sheet metal or other sheet material.

A principal object of the present invention is to provide an improved cutting tool of the character stated which may be made in a small size so that it can be conveniently held in one hand and which, at the same time, is so designed as to have a high degree of cutting power so that cutting, trimming and shearing operations can be performed on sheet metal or other sheet material with ease and rapidity.

Another object of the invention is to provide a cutting tool of the character stated, wherein the tool is designed in such manner that it may be used in a small space and may also be conveniently moved along and over the top of the sheet material operated upon without regard to surface or edge contour.

Still another object of the invention is to provide a cutting tool designed to be operated by air pressure, wherein there is provided a short handle barrel at one end of which a reciprocating air driven piston is supported for movement transversely of the end of the barrel for imparting a hammering operation directly (i. e., without any intervening coupling member) against the shank of a reciprocably mounted cutting tool which moves in a direction transversely of the end of the barrel with respect to a fixed jaw member, the tool cutting edge and jaw member cooperating to have a shearing action upon the sheet material on which the tool is operated.

Still another object of the invention is to provide a tool of the above described character wherein the reciprocating cutter is mounted in a head which is supported for rotary movement on the axis of the cutting tool, whereby the head and cutter may be turned to any one of a number of cutting positions and there secured, to facilitate the use of the tool under a wide variety of conditions.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in top plan of a tool constructed in accordance with a preferred embodiment of the present invention, showing the working or cutting head in position with respect to a sheet of material.

Figure 2 is a view in bottom plan of the tool, that is looking toward the under face of the cutter head and toward the cutting end of the cutter.

Figure 3 is a view in elevation of the left hand side of the tool, a portion of the handle barrel being in longitudinal section.

Figure 4 is a sectional view on an enlarged scale taken substantially on the line 4—4 of Figure 1.

Figure 5 is a transverse section taken substantially on the line 5—5 of Figure 3.

Figure 6 is a detailed view looking toward the point of the free jaw of the cutting head, a portion of the head being broken away and the head being shown detached from the tool handle and piston head.

Figure 7 is a sectional view taken substantially on the line 7—7 of Figure 6.

Figure 8 is a top view of the piston head.

Figure 9 is a view looking toward the working face of the cutter head showing the head in a second position from that shown in Figure 2.

Figure 10 is a view corresponding to Figure 9, but showing the head in a third position.

Figure 11 is a view corresponding to Figure 10, but showing the head in a fourth position and showing in dotted lines the several positions in which the head my be located.

Figure 12 is a view in elevation of the cutter per se looking at the side thereof which is opposite from the fixed cutter jaw of the head.

Figure 13 is a view in elevation of the side of the cutter which works against the fixed cutter jaw.

Figure 14 is a view illustrating the manner in which a sheet of material and the cutter head are related during the cutting operation.

Referring now more particularly to the drawing, the numeral 10 generally designates the handle of the present tool. This handle is in the form of a barrel having a solid rear end portion 11 and the axial chamber 12 which is open at the forward end and interiorly screw threaded as indicated at 13.

At the back end the barrel is provided with a fitting 14 for the attachment thereto of a compressed air line 15 leading from a suitable source of air under pressure, the fitting leading into the air passage 16. This passage is interrupted by a valve seat 17 on which rests a control valve ball 18 which is normally pressed to its seat by a spring 19. At the opposite side of the ball 18 from the spring, is a control button 20 by which the operator can open the valve to permit air to pass through into the chamber 12.

At the inner end of the air passage 16 the passage is enlarged and internally threaded to receive the air conducting tube 21 which extends forwardly through the center of the passage for the purpose about to be described.

The numeral 22 generally designates the piston head. This head comprises a cylinder 23 which is open at its two ends and which has integral with and extending radially from a side thereof the externally threaded stem portion 24 which threads into the forward end of the handle barrel as shown in Figure 3 so that the cylinder lies with its axis transversely of the end of the handle barrel as shown.

The cylinder stem 24 has a central air admission bore 25 into which the forward end of the tube 21 is secured, this bore opening into the cylinder and at opposite sides of the bore 25 are the air exhaust passages 26 which at their forward ends open into the cylinder and at their rear ends open through the end of the stem into the chamber 12.

In the assembled tool, the chamber 12 is filled with a suitable metal wool 27 through which exhausting air passes to exhaust ports 28 formed axially through the back end portion of the barrel. This metal wool functions as a muffler for the exhaust of the air from the tool.

Also forming a part of the piston head is a cylinder sleeve 29 which extends entirely through the cylinder and fits snugly therein but is also rotatable on its long axis for the purpose hereinafter described. At the back end of the head, the cylinder sleeve 29 is closed by the integral cap 30 which is of an overall diameter to cover the adjacent end of the cylinder 23 as is clearly shown in Figure 4.

The opposite end of the cylinder sleeve extends a substantial distance beyond the other end of the cylinder 23 and is externally screw threaded as indicated at 31 for the purpose hereinafter set forth.

The cylinder sleeve 29 is provided with an external circumferential air admission channel 32 which is in communication with the interior of the sleeve by ports 33 and at opposite sides of this channel 32 are corresponding circumferential external channels 34 which are in communication with the interior of the sleeve by ports 35. These channels 32 and 34 are so located that when the sleeve is in working position in the cylinder, the channel 32 will communicate with the air inlet passage 25 and the channels 34 will each communicate with an air exhaust passage 26.

The numeral 36 generally designates the cutter head which comprises a work engaging plate 37 from one side of which extends a shank 38.

The end of the shank 38 remote from the head plate 37, or the free end of the shank, is internally screw threaded as indicated at 39 to receive the threaded end of the cylinder sleeve 29 so that the end of the shank is drawn up against the adjacent end of the cylinder 23 by the rotation of the sleeve 29 in the proper direction with respect to the shank. The cylinder will thus be located between the cap 30 and the end of the shank so that the shank and sleeve will have free rotational movement but the opposing rotational faces will be sufficiently tight together to prevent material air leakage.

Encircling the free end of the shank is a collar 40 across which are formed a series of notches 41 for the collective reception of a securing latch 42. This securing latch is mounted between a pair of radial ears 43 which are formed upon the outer side of the cylinder 23, being oscillatably supported on a pin 44 which extends transversely across and connects the ears. At the end of the latch remote from the end which engages in a notch 41, the latch is angled outwardly to provide a finger engaging end 45 and interposed between this end and the outer wall of the cylinder 23 is a spring 46 which urges oscillation of the latch finger in a direction to maintain the end 42 in the selected notch, whereby the cutter head is secured in a selected working position.

As shown in Figures 5 and 11 a number of notches 41 is provided whereby the cutter head can be turned to any one of a number of working positions. Figure 5 shows eight notches and Figure 11 shows the cutter head in full lines in one working position and in dotted outline in four additional working positions. However, it is to be understood that the invention is not limited to the use of this shown number of positions.

The cutter head plate is here shown as being of circular form. While this is the preferred form it is, obviously, not necessary that the shape of the head be confined to this form.

The head plate is provided with a relatively wide work receiving slot 47 which opens through the edge of the plate and extends inwardly to one side of the center of the plate as is clearly shown in any one of Figures 2, 6, 9, 10 and 11. This slot 47 divides the plate into two portions, designated 47a and 47b and these two portions are offset one from the other in the direction of the longitudinal axis of the cutter head so that the smaller portion 47a, which functions as a fixed jaw is farther away from the shank 38, than the portion 47b which functions as a rest for the tool upon the work. The two portions 47a and 47b accordingly have respectively the top and bottom faces a and b which are in oppositely directed angular planes and the planes of these faces are both oblique to the axis of the shank 38. Accordingly, when the tool is in use the fixed jaw will be located beneath the sheet of material which is being cut and which constitutes the work, while the face b of the rest portion 47b will be upon the top of the work.

The head shank has formed axially therethrough a passage which is generally designated 48 and which is formed in the three portions of different diameters 48a, 48b and 48c. The portion 48a of the shank passage is of polygonal cross section and opens into the work receiving slot 47 and has slidably mounted therein the body of the cutter 49.

The forward end of the cutter body 49 is formed to provide the angular or skew blade 50, the edge of which, when the cutter 49 is moved outwardly for a cutting operation, moves across one side of the work receiving slot 47 or the fixed jaw side so that the edge 51 becomes a fixed blade for cooperation with the cutting edge of blade 50.

The cutter 49 has integral with the back end, the shank 52 which carries at its free end the button head 53 and this shank and button head are located in the intermediate portion 48b of the shank bore as shown in Figure 4. In this intermediate portion of the bore is housed a coil spring 54 which engages the head 53 of the cutter and constantly urges the cutter inwardly away from the fixed jaw 47.

In the rest side of the work receiving slot 47 there is formed a guide slot 55 in which the cutter 49 moves, this slot being extended into the shank and forming one side of the small portion 48a of the shank bore.

As shown in Figure 4, the inner and larger portion 48c of the shank bore receives the threaded end of the cylinder sleeve 29 and also positioned in this portion 48c of the shank 4 is the flange 56 of a piston guide collar 57 which fits snugly in the open or tool end of the cylinder sleeve 29 as shown, to receive the stem 60 of the compresed air actuated piston 61. This piston 61 in its reciprocating movements drives the stem or hammer 60 against the inner end of the cutter shank or button 53 so as to force the cutter outwardly for cooperation of the cutting edge of blade 50 with the fixed blade edge 51 of the fixed jaw 47a. Return movement of the cutter is of course effected by the compressed spring 54 as the piston 61 moves inwardly in the cylinder sleeve away from the cutter.

The construction and operation of the piston are fully set forth in my copending application Serial No. 273,588 filed of even date herewith, and accordingly it is not believed that it will be necessary to set forth here a detailed description of the piston construction and the manner of its operation by receiving air from the passage 25 alternately in the opposite ends of the cylinder sleeve and exhausting the air alternately through the passages 26 to effect the desired high speed reciprocation of the piston.

In Figure 1 the tool is shown in association with a sheet of material which is generally designated S and which may comprise sheet metal or the like and the reference character S' designates a strip of material which is being cut by the tool. As shown, the tool here has the slot 47 directed to the right or in the direction of cut as designated by the arrow A. In the use of the tool in this manner, the point of the fixed jaw 47a is started under the left hand edge of the sheet so that the sheet will engage the top surface a of the fixed jaw, while the rest portion 47b rides on the surface of the sheet, the sheet top surface engaging the face b of the rest portion. As the tool is advanced in the direction of the arrow A, the edge of the sheet will move into the convergent angles formed by the cutting edge 50 of the tool and the fixed edge 51 of the fixed jaw, the angular relation of these edges being shown in Figure 7, and as the operator opens the valve 18, the compressed air will effect the reciprocation of the hammer piston 61 so as to impart necessary driving movements to the cutter. As the cutter reciprocates the metal will be sheared or cut to remove the strip S' or the tool can be turned in any direction to follow desired contours.

As will be readily apparent, if it is desired to use the tool by moving it to the left, the latch finger 42 will be elevated from the notch 41 in which it is engaged so that the entire tool or cutter head 36 can be rotated so as to swing the slot 47 around to the position in which it is shown in Figure 10, or if the tool is to be advanced from the operator, then the head can be turned to the position shown in Figure 9, or it may be used by drawing the tool toward the operator, in which case the head will be turned so that the slot will be directed toward the operator as shown in Figure 11.

From the foregoing it will be readily seen that there is provided by the present invention a cutting tool which is highly versatile and due to the novel construction and arrangement of the power unit in the head or forward end of the handle the tool can be made light and at the same time very powerful in operation.

I claim:

1. An air operated cutting tool comprising a handle, means at one end thereof forming a cylinder having its axis transversely of the handle, a sleeve rotatably positioned in and extending through the cylinder, the sleeve being closed at one end and open at the other, a cutting head having a tubular shank attached at the end remote from the head to the open end of and comunicating with said sleeve, the head including a cutting jaw having a cutting edge, a cutter blade reciprocably supported in the tubular shank and having a shearing edge movable across said cutting edge, the blade having a shank directed toward the open end of the sleeve, an air driven piston in the sleeve, a hammer on the piston directed into said tubular shank for contact with the blade shank, resilient means engaging the blade shank and urging the blade away from the cutting jaw edge, and means for admitting air into and exhausting it from the cylinder sleeve for effecting reciprocation of the piston.

2. A cutting tool comprising a cutter head in the form of a plate having a wide slot cut therein from the edge to approximately the center thereof, an elongate shank extending from and substantially perpendicular to one face of the plate and joined thereto on one side of the slot, the shank having a cutter guide passage longitudinally therethrough and opening at one end toward said slot, the part of the plate at the side of the slot opposite from the side to which the shank is attached forming a fixed jaw the longitudinal edge of which nearest the shank forming a cutting edge, said fixed jaw being positioned relative to the opposite side of the slot to dispose the shearing edge at an oblique angle relative to the axis of the shank, a cutter reciprocably mounted in the shank passage for extension into the slot across said cutting edge, the cutter having an oblique shearing edge coacting with said cutting edge, and means for effecting the reciprocation of said cutter.

3. An air operated cutting tool comprising a handle body, means at one end thereof forming a cylinder, the cylinder having its axis extending transversely of the handle, a sleeve rotatably supported within the cylinder, a cap closing one end of the sleeve and lying against one end of the cylinder, the cap having its edge projecting beyond the outside diameter of the cylinder and providing a means for turning the latter, a cutter head, an elongate shank joined at one end to said head, means coupling the other end of said shank to the other end of the sleeve, said shank having a longitudinal passage therethrough opening into the adjacent end of the sleeve and coaxial therewith, a cutter blade reciprocably supported in said shank passage and having a cutting edge directed toward said head, a fluid actuated piston in the sleeve, means for reciprocating the piston by fluid pressure, means for applying driving blows to the cutter blade to drive the blade outwardly, means for retracting the outwardly driven blade, the cutter head, shank and sleeve being rotatable as a unit, and means for releasably holding the unit against rotation.

4. A tool as stated in claim 3, wherein said head comprises a circular plate having a wide slot formed therein from the edge to approximately the center thereof, the shank being joined to one face of the plate at one side of the slot, the part of the plate at the opposite side of the slot from the shank forming a fixed jaw having a free point, the longitudinal edge of said fixed jaw nearest to the shank forming a shearing edge for coaction with the edge of said blade, said fixed jaw being disposed to have the top surface thereof in a plane oblique to the path of reciprocation of the cutter whereby said free point of the jaw may enter beneath a sheet of material to be cut.

5. The invention according to claim 3, wherein the said releasable holding means comprises a plurality of spaced teeth disposed in a circle around the sleeve and projecting radially beyond the outside diameter of the cylinder and a spring pressed latch pivotally supported on the cylinder and having a free end selectively detachably engageable in the spaces between the teeth.

6. A sheet material cutting tool comprising an elongate handle, a cylinder carried by the handle at one end and having its longitudinal axis extending across the length of the handle, a cutting head including a work engaging plate and a tubular shank, the shank being coupled at one end to an end of the cylinder to extend lengthwise therefrom, said work engaging plate being slotted to provide two portions, said portions being in angularly related planes whereby one portion may engage below an edge of a sheet of material and the other portion may position above such sheet, a reciprocable cutter element in said tubular shank, the cutter having a cutting edge on one end directed toward said plate, a reciprocable piston in the cylinder, said piston directly delivering the force of its reciprocation to said cutter, the longitudinal axis of said piston coinciding with that of said cutter.

7. The invention according to claim 6, with means coupling the shank with the cylinder for turning the shank on the axis of the cylinder.

8. The invention according to claim 6, wherein the last stated means comprises a head upon the other end of the cutter element, a spring in the tubular shank connected between the shank and the cutter element head, and a hammer element actuated by the piston against the last named head.

References Cited in the file of this patent

UNITED STATES PATENTS

| Number | Name | Date |
|---|---|---|
| 1,737,884 | Hexdall | Dec. 3, 1929 |